United States Patent [19]

Tanoue et al.

[11] 4,185,877
[45] Jan. 29, 1980

[54] SHOE FOR CRAWLER BELT

[75] Inventors: Takakiyo Tanoue; Noriyuki Itakura, both of Akashi, Japan

[73] Assignee: Mitsubishi Jukogyo Kabushiki Kaisha, Tokyo, Japan

[21] Appl. No.: 905,448

[22] Filed: May 12, 1978

[30] Foreign Application Priority Data

May 27, 1977 [JP] Japan .............................. 52/68187[U]

[51] Int. Cl.² .......................................... B62D 55/26
[52] U.S. Cl. .................................... 305/35 R; 305/46
[58] Field of Search .................. 305/46, 35 R, 36, 51, 305/38

[56] References Cited

U.S. PATENT DOCUMENTS 1,765,580  6/1930  Haggart ................................ 305/46

FOREIGN PATENT DOCUMENTS 1016757  1/1966  United Kingdom ..................... 305/38

Primary Examiner—David A. Scherbel

[57] ABSTRACT

A shoe for a crawler belt comprises a tray-like shoe plate, an elastic member in which fastener bushes are fitted, and a rigid tread plate affixed to one side of the elastic member. The elastic member is accommodated in the tray-like shoe plate in such a manner that the rigid tread plate is partly or wholly exposed out of the tray. The rigid tread plate and the elastic member are both detachably secured to the shoe plate by fasteners through the bushes.

6 Claims, 13 Drawing Figures

SHOE FOR CRAWLER BELT

BACKGROUND OF THE INVENTION

This invention relates to improvements in a shoe for crawler belts of hydraulic shovels, tractors, tractor shovels, and other crawler type vehicles.

Conventionally, to protect the road surface against the roughing effect of the crawlers of running vehicles, each shoe of the crawlers is made, as shown in FIGS. 1 and 2, by securing a shoe plate 2 to track links 3 by bolts 5 and nuts 6 and then affixing an elastic thread plate 1 to the other side of the shoe plate by thermal fitting or bonding. However, because of its rather low resistance to shearing loads, the elastic tread plate thus supported on one side only, with the remainder of its surfaces exposed, tends to be damaged by the shearing loads to which it is subjected during the running of the vehicle. This necessitates frequent replacement of the elastic plates.

In addition, the elastic tread plate can often be chipped locally when it touches a sharp edge of rock or the like, again calling for frequent downtime for replacement.

Another crawler shoe of the prior art uses an elastic tread plate 1 not directly affixed by thermal fitting to the shoe plate 2 but, as shown in FIG. 3, to a rigid interlayer 4, which in turn is secured to the shoe plate 2 by bolts 5 and nuts 6 which fasten the plate 2 and links 3 together. This arrangement is again not desirable for the travel of the crawlers, because the elastic member often suffers damage.

It is further noted that field operations of the crawler-type equipment are apt to cause damage of their shoes and, under severe site conditions, the crawler shoes have to be replaced as often as not.

The present invention has for its object to overcome the foregoing disadvantages and provide a crawler shoe which has adequate strength, reduces the noise of the running vehicle, and protects the road on which it bears.

The above and other objects, features, and advantages of the invention will become more apparent from the following disclosure.

SUMMARY OF INVENTION

In brief, the present invention provides a crawler shoe comprising a tray-like shoe plate, and elastic member in which bushes are shrinkage fitted or thermally joined or fused, affixed to one side of the elastic member. The elastic member is accommodated in the tray-like shoe plate in such a manner that the tread plate is partly or entirely exposed out of the shoe plate; the tread plate and the elastic member are detachably secured to the hoe plate with fastener means extending through the bushes.

The advantages offered by the crawler show of the present invention are summarized as follows:

(1) The shoe has adequate strength against external forces and is hardly damaged, resulting in a reduced frequency of shoe replacement;

(2) The crawler noise is abated and paved roads are protected against impairment;

(3) The intervals of shoe replacement necessary according to varied field conditions are extended;

(4) The shoe can be attached and detached with ease.

DESCRIPTION OF THE INVENTION

Figure 1:
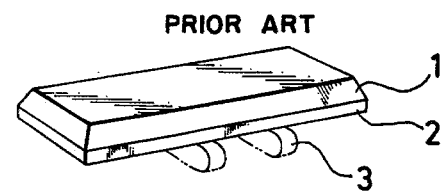
FIG. 1 is a perspective view of a conventional crawler shoe.
Figure 2:
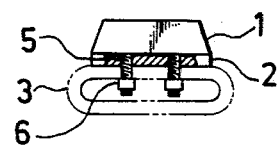
FIG. 2 is a partly sectional front view of the shoe.
Figure 3:
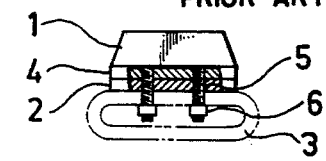
FIG. 3 is a partly sectional front view of another shoe of the prior art.
Figure 4:
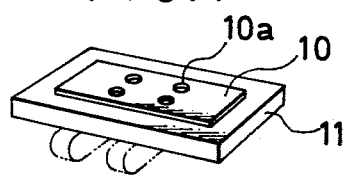
FIG. 4 is a perspective view of an embodiment of the invention.
Figure 5:
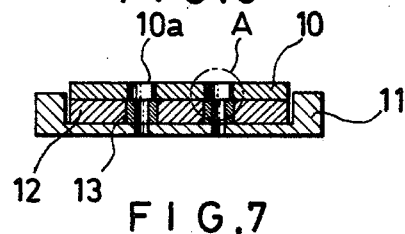
FIG. 5 is a vertical sectional view of the embodiment.
Figures 6, 7:
FIGS. 6 and 7 are partly sectional side views of other embodiments of the invention.

Referring now to FIGS. 4 and 5, which show an embodiment of the invention, the numeral 11 indicates a tray-like rigid shoe plate. In the cavity of this plate 11 is accommodated an elastic member 12 through which rigid bushes 13 are inserted securely by shrinkage fit to be thermally joined or fused together. The elastic member 12 consists of rubber or other elastic material, and a rigid tread plate 10 formed with bolt holes 10a is thermally joined to the member 12. The tread plate 10 is exposed either wholly (FIG. 6) or partly (FIG. 7) out of the tray-like shoe plate 11.

Figure 8:
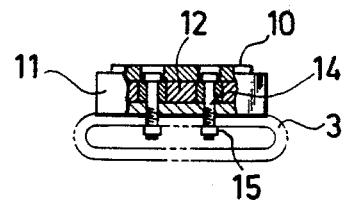
FIGS. 8 and 9 are front and vertical sectional views, respectively, of the embodiments shown in FIGS. 6 and 7, with the shoe plates secured to links.

Next, bolts 14 are inserted through the holes 10a of the tread plate 10 to fasten the tread plate 10, elastic member 12, and shoe plate 11 together to track links 3, in a detachable manner, with the aid of nuts 15 (FIG. 8).

Figure 9:
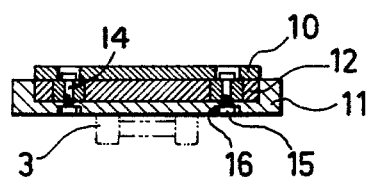

Alternatively, the tread plate 10, elastic member 12, and shoe plate 11 may be joined, as illustrated in FIG. 9, by forming recesses 16 by spot facing in the shoe plate 11 and fastening those components together by bolts 14 and nuts 15, with the shoe plate 11 being separately bolted to the links 3.

Figure 10:
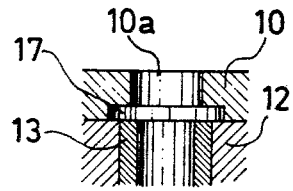
FIG. 10 is an enlarged sectional view of the portion A in FIG. 5.
Figure 11:
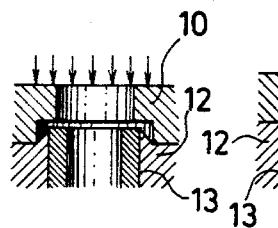
FIG. 11 is a view explanatory of the same portion at work.
Figure 12:
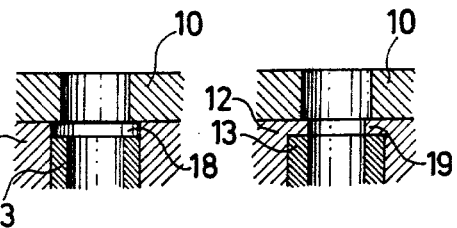
FIGS. 12 and 13 are sectional views of two other modifications of the same portion.
Figure 13:
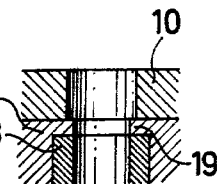

The tread plate 10 and the bushes 13 are made so that their matching faces are always out of contact. By way of example, the encircled portion A of FIG. 5, showing such matching faces, is enlarged in FIGS. 10 through 13. In the arrangement of FIG. 10 the tread plate 10 is formed with a recess 17 by spot facing, in such a way that, even if the elastic member 12 is compressed by external forces applied in the direction of arrows in FIG. 11, the tread plate 10 and the bushes 13 will be kept out of contact. The same effect is attained by the modifications shown in FIG. 12, where an annular gap 18 is left between the elastic member 12 and each of the bushes 13 thermally fitted to the member, and in FIG. 13, where an inward extension 19 forming an annular constriction of the elastic member 12 covers the top of the bush 13.

The functional effects of the crawler shoe of the afore-described construction according to the invention, to be achieved during running of the vehicle equipped with the crawler belts including such shoes, will now be explained.

Since the side faces of the elastic member 12 are covered by the surrounding edges of the tray-like shoe plate 11, any shearing loads which may act on the shoe will be taken up by the edges or side walls of the plate 11, leaving the elastic member 12 undamaged. Moreover, because the rigid tread plate 10 overlies the elastic member 12, the latter is not directly subjected to the shearing loads.

Compressive loads are first received by the rigid tread plate 10 and then the elastic member 12 is compressed. However, because the loads are borne jointly by the tread plate 10 and the shoe plate 11, the elastic member 12 is protected against damage.

The crawler shoe of the invention, which receives external forces with the rigid shoe plate as above described, withstands the service conditions in most of usual construction sites. Accordingly, the frequency of crawler shoe replacement which would otherwise be necessary depending on the field conditions is markedly decreased.

The component parts, especially the tread plate 10 and the elastic member 12, when worn or damaged, can be easily detached for replacement.

Furthermore, because the rigid tread plate 10 is spaced from the bushes 13, the vibration of the tread plate is always transmitted through the elastic member 12. This reduces the noise of the running vehicle and minimizes the impairment of road surface.

In brief, the invention provides a crawler shoe comprising a tray-like shoe plate, an elastic member in which bushes are shrinkage fitted, and a tread plate affixed to one side of the elastic member, said elastic member being accommodated in said tray-like shoe plate in such a manner that said tread plate is partly or entirely exposed out of said shoe plate, said tread plate and said elastic member being detachably secured to said shoe plate with fastener means through said bushes. The advantages offered by the crawler shoe of the invention may be summarized as follows:

(1) The shoe has adequate strength against external forces and is hardly damaged, with a reduced frequency of shoe replacement.

(2) The crawler noise is abated and paved roads are protected against impairment.

(3) The intervals of shoe replacement necessary according to varied field conditions can always be extended.

(4) The shoe can be attached and detached with ease.

What is claimed is:

1. A shoe for a crawler belt comprising a tray-like plate defining a central cavity and surrounding peripheral walls, an elastic member substantially conforming to and located within said cavity, a plurality of bushes fixedly secured within said elastic members and fastening means extending through said bushes to detachably secure said elastic members to said tray-like plate, and a rigid tread plate conforming to and bonded to the surface of said elastic member, said elastic member and said walls being relatively dimensioned so that said rigid tread plate extends at least in part out of said cavity and said walls support said elastic member in the lateral direction.

2. The shoe according to claim 1 including holes in said rigid tread plate, aligned with said bushes for removing and inserting said fastening means.

3. The shoe according to claim 2 wherein said fastening means extends through said shoe plate and are adapted to be secured to a track link.

4. The shoe according to claim 1 or 2 wherein the opposing faces of the rigid tread plate and the bushes are formed so that they are spaced from each other.

5. The shoe according to claim 4 sherein said rigid tread plate is formed with a recess aligned with each of said bushes.

6. The shoe according to claim 4 wherein said bushes are set below the surface of said elastic tread bonded with said rigid tread plate.

* * * * *